(12) United States Patent
Watanabe et al.

(10) Patent No.: US 11,331,859 B2
(45) Date of Patent: *May 17, 2022

(54) PLASTICIZING DEVICE, INJECTION MOLDING MACHINE, AND MOLDING DEVICE

(71) Applicant: Seiko Epson Corporation, Tokyo (JP)

(72) Inventors: Yusuke Watanabe, Shiojiri (JP); Kei Yokota, Matsumoto (JP); Yuichi Sasage, Suwa (JP); Kenta Anegawa, Matsumoto (JP); Seiichiro Yamashita, Azumino (JP); Mitsuru Inutsuka, Kawagoe (JP); Kakeru Sasagawa, Matsumoto (JP)

(73) Assignee: Seiko Epson Corporation

( * ) Notice: Subject to any disclaimer, the term of this patent is extended or adjusted under 35 U.S.C. 154(b) by 507 days.

This patent is subject to a terminal disclaimer.

(21) Appl. No.: 16/419,119

(22) Filed: May 22, 2019

(65) Prior Publication Data

US 2019/0358903 A1 Nov. 28, 2019

(30) Foreign Application Priority Data

May 23, 2018 (JP) .............................. JP2018-098400

(51) Int. Cl.
*B29C 64/314* (2017.01)
*B29C 45/76* (2006.01)
(Continued)

(52) U.S. Cl.
CPC ............ *B29C 64/314* (2017.08); *B29C 45/47* (2013.01); *B29C 45/76* (2013.01); *B29C 64/209* (2017.08);
(Continued)

(58) Field of Classification Search
CPC ....... B29C 64/314; B29C 45/47; B29C 45/76; B29C 64/209; B29C 64/393;
(Continued)

(56) References Cited

U.S. PATENT DOCUMENTS 3,355,764 A  12/1967 Moyer
3,577,841 A  5/1971 Ledoux et al.
(Continued)

FOREIGN PATENT DOCUMENTS

JP  352-021020 B1  6/1977
JP  362-018236 A  1/1987
(Continued)

*Primary Examiner* — Michael M. Robinson
(74) *Attorney, Agent, or Firm* — Harness, Dickey & Pierce, P.L.C.

(57) ABSTRACT

A plasticizing device includes a first member having a groove portion that has a spiral shape extending to a center, a motor that rotates the first member, a second member that faces the first member, and a heating unit for heating a material that is transported along the groove portion, the first member having a plurality of recessed portions on a bottom surface of the groove portion. By providing a plurality of recessed portions on the bottom surface of the first member through which the material flows, the rotational force of the rotating first member is easily transmitted to the material and the amount of material flowing in the first member can be increased.

9 Claims, 8 Drawing Sheets

(51) Int. Cl.
  *B29C 45/47* (2006.01)
  *B33Y 30/00* (2015.01)
  *B29C 64/393* (2017.01)
  *B33Y 40/00* (2020.01)
  *B33Y 50/02* (2015.01)
  *B29C 64/209* (2017.01)

(52) U.S. Cl.
  CPC ............ *B29C 64/393* (2017.08); *B33Y 30/00* (2014.12); *B33Y 40/00* (2014.12); *B33Y 50/02* (2014.12); *B29C 2945/76658* (2013.01)

(58) Field of Classification Search
  CPC .......... B29C 2945/76658; B33Y 30/00; B33Y 40/00; B33Y 50/02
  See application file for complete search history.

(56) References Cited

U.S. PATENT DOCUMENTS

| | | | |
|---|---|---|---|
| 3,790,328 A | 2/1974 | Maxwell | |
| 4,553,922 A | 11/1985 | Winner | |
| 6,077,062 A | 6/2000 | Guillemette et al. | |
| 6,187,237 B1 | 2/2001 | Kirjavainen et al. | |
| 6,217,206 B1 | 4/2001 | Kirjavainen et al. | |
| 10,800,083 B2 | 10/2020 | Zhu | |
| 2007/0082079 A1 | 4/2007 | Peavey et al. | |
| 2009/0020906 A1* | 1/2009 | Neumann | B29C 48/05 264/176.1 |
| 2009/0096129 A1 | 4/2009 | Hirota et al. | |
| 2010/0316754 A1 | 12/2010 | Lupke et al. | |
| 2017/0210069 A1 | 7/2017 | Stubenruss | |
| 2018/0311894 A1 | 11/2018 | Saito et al. | |
| 2018/0326658 A1 | 11/2018 | Saito et al. | |
| 2019/0061243 A1 | 2/2019 | Saito et al. | |
| 2019/0160746 A1 | 5/2019 | Anegawa et al. | |
| 2019/0248069 A1 | 8/2019 | Anegawa et al. | |
| 2019/0255762 A1 | 8/2019 | Mizukami et al. | |
| 2019/0255772 A1 | 8/2019 | Mizukami et al. | |
| 2019/0283321 A1 | 9/2019 | Mizukami et al. | |
| 2019/0358903 A1 | 11/2019 | Watanabe et al. | |
| 2020/0016832 A1 | 1/2020 | Yuwaki et al. | |
| 2020/0016833 A1 | 1/2020 | Yuwaki et al. | |
| 2020/0016834 A1 | 1/2020 | Yuwaki et al. | |
| 2020/0031037 A1 | 1/2020 | Hideshima | |
| 2020/0061914 A1 | 2/2020 | Onishi | |
| 2020/0094476 A1 | 3/2020 | Yamasaki et al. | |
| 2020/0101661 A1 | 4/2020 | Sasagawa et al. | |
| 2020/0101672 A1 | 4/2020 | Watanabe et al. | |
| 2020/0114582 A1 | 4/2020 | Hideshima | |
| 2020/0122407 A1 | 4/2020 | Yamazaki | |
| 2020/0139629 A1 | 5/2020 | Yokota | |
| 2020/0164589 A1 | 5/2020 | Yuwaki et al. | |
| 2020/0171745 A1 | 6/2020 | Yuwaki et al. | |
| 2020/0207016 A1 | 7/2020 | Anegawa et al. | |
| 2020/0207017 A1 | 7/2020 | Yuwaki et al. | |
| 2020/0238611 A1 | 7/2020 | Watanabe | |
| 2020/0238612 A1 | 7/2020 | Watanabe | |
| 2020/0269502 A1 | 8/2020 | Anegawa et al. | |
| 2020/0269515 A1 | 8/2020 | Takahashi | |
| 2020/0307082 A1 | 10/2020 | Yuwaki et al. | |
| 2020/0307091 A1 | 10/2020 | Kobayashi | |
| 2020/0307093 A1 | 10/2020 | Yuwaki et al. | |

FOREIGN PATENT DOCUMENTS

| | | |
|---|---|---|
| JP | H03-153311 A | 7/1991 |
| JP | H05-138756 A | 6/1993 |
| JP | H10-230542 A | 9/1998 |
| JP | 2006-247917 A | 9/2006 |
| JP | 2007-245503 A | 9/2007 |
| JP | 2009-137260 A | 6/2009 |
| JP | 2009-269182 A | 11/2009 |
| JP | 2009-269183 A | 11/2009 |
| JP | 2009-285879 A | 12/2009 |
| JP | 2010-000752 A | 1/2010 |
| JP | 2010-052264 A | 3/2010 |
| JP | 2010-208051 A | 9/2010 |
| JP | 2010-214839 A | 9/2010 |
| JP | 2010-241016 A | 10/2010 |
| JP | 2011-020378 A | 2/2011 |
| JP | 5088818 B2 | 12/2012 |
| JP | 2014-237300 A | 12/2014 |
| JP | 2015-101053 A | 6/2015 |
| JP | 2017-023981 A | 2/2017 |
| JP | 2018-187777 A | 11/2018 |
| WO | 2007/119533 A1 | 10/2007 |
| WO | 2008-100467 A1 | 8/2008 |
| WO | 2016/020150 A1 | 2/2016 |

* cited by examiner

| | DISCHARGE AMOUNT (g) | |
|---|---|---|
| | WITHOUT RECESSED PORTIONS | WITH RECESSED PORTIONS (HEMISPHERICAL SHAPE) |
| Ave | 3.715 | 4.040 |
| Max | 4.228 | 4.435 |
| Min | 2.735 | 3.571 |
| Max−Min | 1.493 | 0.864 |
| σ | 0.290 | 0.200 |

| | DISCHARGE AMOUNT (g) | |
|---|---|---|
| | WITHOUT RECESSED PORTIONS | WITH RECESSED PORTIONS (SQUARE PYRAMIDAL SHAPE) |
| Ave | 3.715 | 3.966 |
| Max | 4.228 | 4.538 |
| Min | 2.735 | 3.368 |
| Max−Min | 1.493 | 1.170 |
| σ | 0.290 | 0.297 |

| | DISCHARGE AMOUNT (g) | |
|---|---|---|
| | WITHOUT RECESSED PORTIONS | WITH RECESSED PORTIONS (ELECTRIC DISCHARGE MACHINING) |
| Ave | 3.715 | 4.416 |
| Max | 4.228 | 4.552 |
| Min | 2.735 | 4.232 |
| Max-Min | 1.493 | 0.320 |
| σ | 0.290 | 0.080 |

PLASTICIZING DEVICE, INJECTION MOLDING MACHINE, AND MOLDING DEVICE

The present application is based on, and claims priority from JP Application Serial Number 2018-098400, filed May 23, 2018, the disclosure of which is hereby incorporated by reference herein in its entirety.

BACKGROUND

1. Technical Field

The present disclosure relates to a plasticizing device, an injection molding machine, and a molding device.

2. Related Art

In recent injection molding machines and molding devices that perform three-dimensional molding, a plasticizing device including a flat screw for heating and plasticizing a material may be used in some cases. On one side of the flat screw, a groove portion is provided for circulating the material while plasticizing it. In this groove portion, for example, various improvements have been made to enhance the performance of the flat screw, such as the plasticizing amount, delivery amount and kneading amount of the material. For example, JP-A-2009-285879 discloses a flat screw having a cylindrical pin on a downstream side of the groove portion.

In existing techniques, studies have been made to enhance the performance of plasticizing the material by improving the amount of kneading of the material in the groove portion of the flat screw. However, it cannot be said that the amount of supply of the material downstream from the plasticizing device has been adequately studied. The inventors found that to stabilize the amount of supply from a nozzle of the molding device coupled downstream of the plasticizing device, it is necessary to increase the amount of supply of the material downstream of the plasticizing device. Further, the above-described problem is not limited to a molding device, but is a problem common to injection molding machines.

SUMMARY

According to an aspect of the present disclosure, a plasticizing device is provided. The plasticizing device includes a first member having a groove portion that has a spiral shape extending to a center, a motor that rotates the first member, a second member that faces the first member, and a heating unit for heating a material that is transported along the groove portion. The first member may include a plurality of recessed portions on a bottom surface of the groove portion.

DESCRIPTION OF EXEMPLARY EMBODIMENTS

A. First Embodiment

A1. Device Configuration

Figure 1:
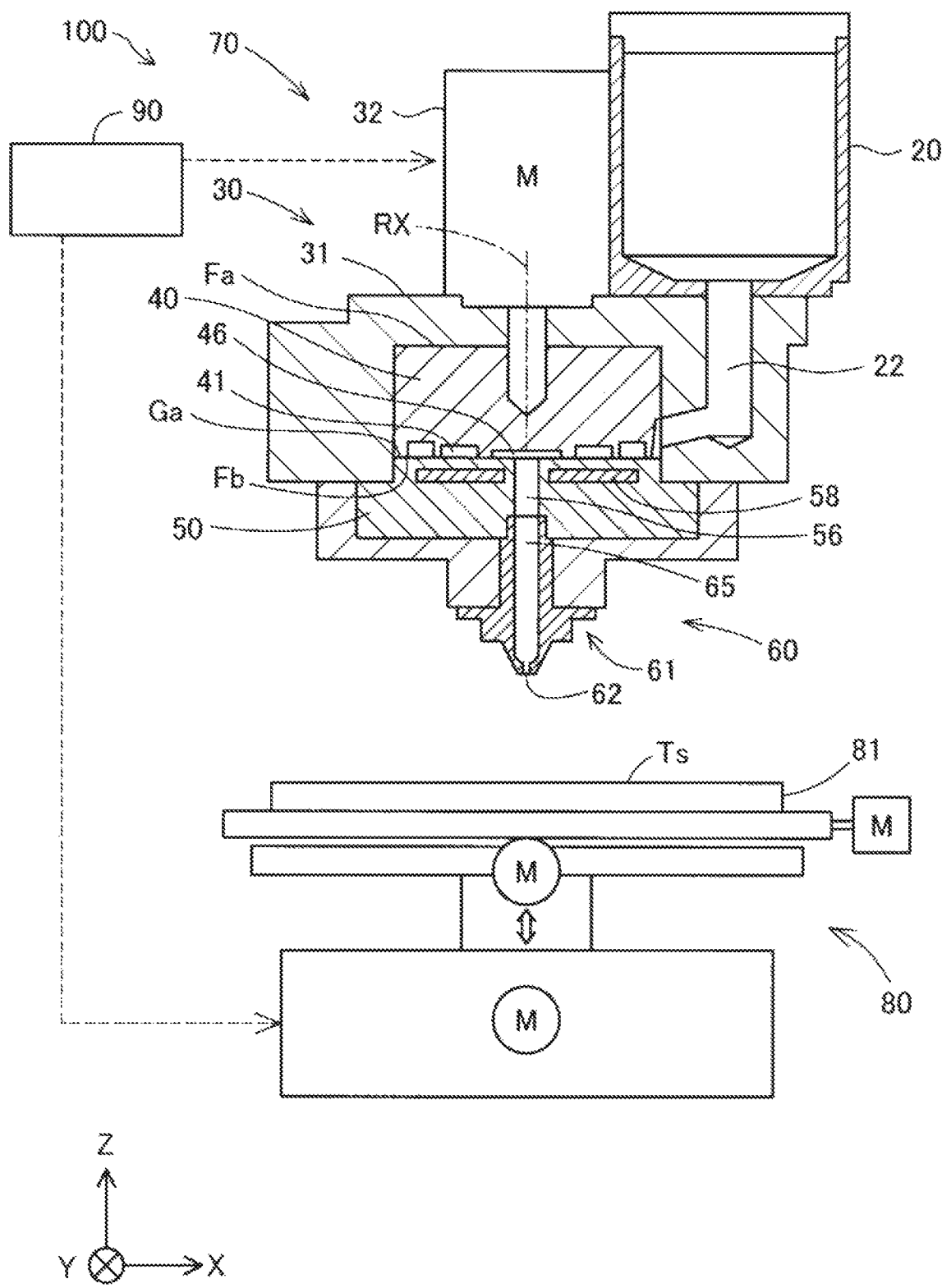
FIG. 1 is a schematic diagram illustrating a configuration of a molding device, where some members are illustrated in cross section.

FIG. 1 is a schematic diagram illustrating a configuration of a molding device 100 that performs molding of a three-dimensional molding object where some members are illustrated in cross section. The molding device 100 includes a control unit 90, a molding table 81, a movement mechanism 80, and a molding unit 70. Hereinafter, a three-dimensional molding object will also be simply referred to as a "molding object". The molding device 100 deposits molding material on the molding table 81 moved by the movement mechanism 80 to mold a molding object.

The control unit 90 is a control device that controls the overall movement of the molding device 100 and executes a molding process of molding a molding object. The movement includes movement of the three-dimensional relative position of the molding unit 70 relative to the molding table 81. The directions of this movement are illustrated in FIG. 1 as three mutually perpendicular directions X, Y, and Z. The X direction and the Y direction are horizontal directions, and the Z direction is a direction opposite to the direction of gravity. Arrows indicating the X, Y, and Z directions are appropriately illustrated also in other reference diagrams so that the illustrated directions correspond to FIG. 1.

In the present embodiment, the control unit 90 is formed of a computer having one or more processors, a main storage device, and an input/output interface for inputting/outputting signals from/to the outside. The control unit 90 performs various functions by executing programs and instructions read on the main storage device. Further, the control unit 90, instead of being formed by such a computer, may be realized by a configuration in which a plurality of circuits for realizing at least a portion of each function are combined.

The molding table 81 is a planar member on which molding material is to be deposited. The molding table 81 has an upper surface Ts disposed parallel to the X and Y directions. The molding table 81 is disposed at a position facing a discharge unit 60 of the molding device 100. The movement mechanism 80 changes the relative positional relationship between the discharge unit 60 and the molding table 81 under the control of the control unit 90. The movement mechanism 80 is formed of a three-axis positioner that moves the molding table 81 in three axial directions of the X, Y, and Z directions by the driving force of three motors M.

The molding unit 70 disposes the plasticized molding material on the molding table 81. The molding unit 70 includes a material supply unit 20, a plasticizing device 30, and the discharge unit 60. "Plasticizing" means that heat is applied to a thermoplastic material and at least a portion of the material is melted.

The material supply unit 20 supplies the material to the plasticizing device 30. The material supply unit 20 is formed of, for example, a hopper for storing the material. The material supply unit 20 has a discharge port on the lower side thereof. This discharge port is coupled to the plasticizing device 30 via a communication path 22. The material is charged into the material supply unit 20 in any of various granular forms such as pellets and powder. In this embodiment, a material obtained by pelletizing a urethane-based thermoplastic elastomer resin (also referred to as "TPU") is used. Thermoplastic elastomer (also referred to as "TPE") is a material made of a polymer or polymer blend that has the same properties as vulcanized rubber at room temperature and that can be molded or remolded at a high temperature like a thermoplastic resin.

Figure 2:
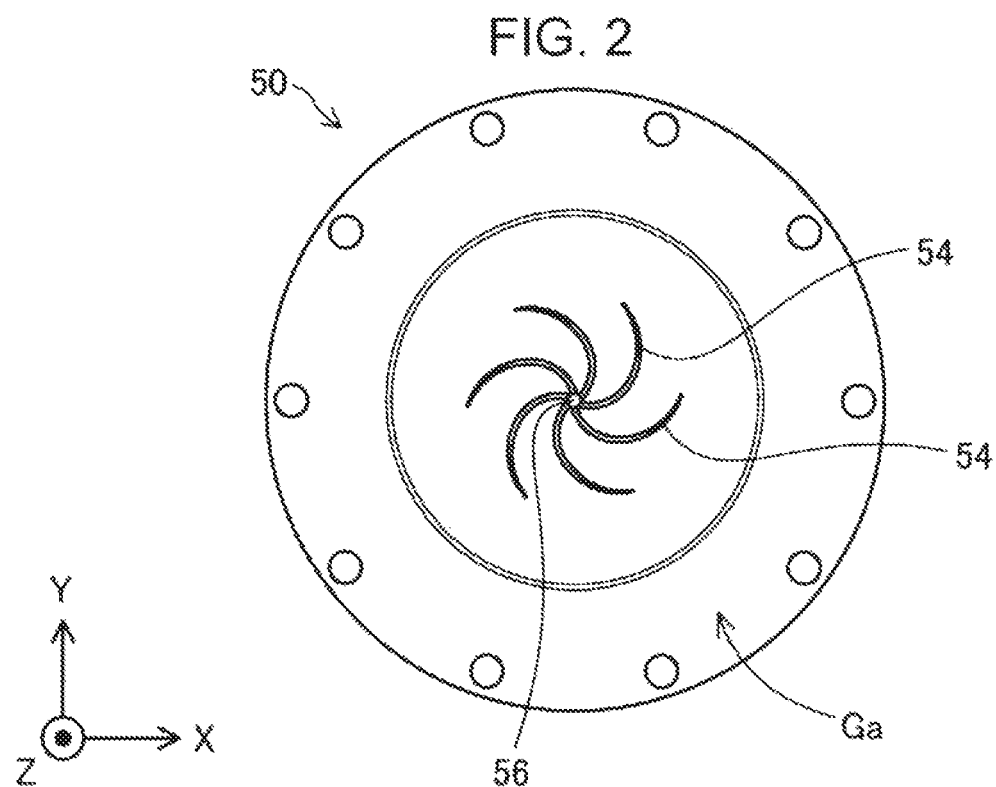
FIG. 2 is a plan view illustrating an upper surface side of a screw-facing portion.
Figure 4:
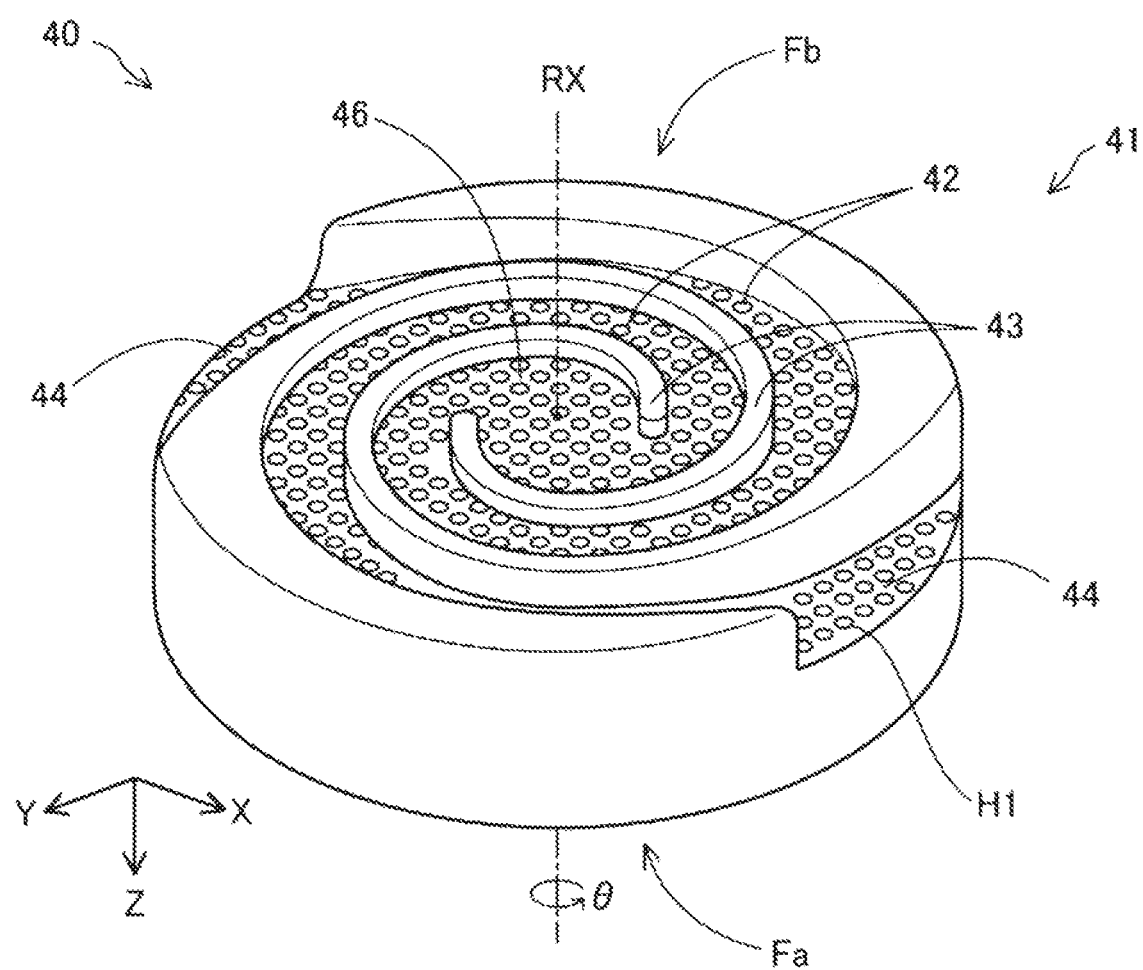
FIG. 4 is a perspective view illustrating a schematic configuration of a lower surface side of a flat screw.

The plasticizing device 30 plasticizes at least a portion of the solid material supplied from the material supply unit 20 to generate a paste-like molding material having fluidity and guides it to the discharge unit 60. The plasticizing device 30 has a screw case 31, a drive motor 32, a flat screw 40 as a first member, and a screw-facing portion 50 as a second member. Specific configurations of the screw-facing portion 50 and the flat screw 40 are illustrated in FIGS. 2 and 4, which will be described later.

The flat screw 40 has a substantially columnar shape in which a height in an axial direction, which is a direction along a center axis thereof, is smaller than a diameter. The flat screw 40 is disposed so that the axial direction thereof is parallel to the Z direction and rotates along a circumferential direction. The center axis of the flat screw 40 coincides with a rotation axis RX thereof. In FIG. 1, the rotation axis RX of the flat screw 40 is illustrated by a chain line.

The flat screw 40 is stored in the screw case 31. An upper surface Fa side of the flat screw 40 is coupled to the drive motor 32, and the flat screw 40 rotates in the screw case 31 by a rotational driving force generated by the drive motor 32. The drive motor 32 is driven under the control of the control unit 90.

In the flat screw 40, groove portions 41 are formed on a lower surface Fb, which is a surface intersecting the rotation axis RX. The communication path 22 of the above-described material supply unit 20 is coupled to the groove portions 41 from the side surface of the flat screw 40.

The lower surface Fb of the flat screw 40 faces an upper surface Ga of the screw-facing portion 50, and a space is formed between the groove portions 41 of the lower surface Fb of the flat screw 40 and the upper surface Ga of the screw-facing portion 50. In the molding device 100, the material is supplied from the material supply unit 20 to this space between the flat screw 40 and the screw-facing portion 50. The specific configuration of the flat screw 40 and the groove portions 41 thereof will be described later with reference to FIG. 4.

A heating unit 58 for heating the material is embedded in the screw-facing portion 50. As the heating unit 58, a commonly used heater can be adopted. The material supplied into the groove portions 41 of the flat screw 40, which is rotating, while at least a portion thereof is being melted by heating with the heating unit 58 and rotation of the flat screw 40, flows along the groove portions 41 and is led to a center portion 46 of the flat screw 40. The paste-like material flowing into the center portion 46 is supplied to the discharge unit 60 as a molding material via a communication hole 56 provided at the center of the screw-facing portion 50.

FIG. 2 is a plan view illustrating the upper surface Ga side of the screw-facing portion 50. Referring to FIG. 2 together with FIG. 1, the configuration of the screw-facing portion 50 will be described. The upper surface Ga of the screw-facing portion 50 faces the lower surface Fb of the flat screw 40 as described above. Hereinafter, this upper surface Ga will also be referred to as "screw-facing surface Ga".

On the screw-facing surface Ga, a plurality of guide grooves 54 are formed. The guide grooves 54 are coupled to the communication hole 56 formed at the center of the screw-facing surface Ga and extend spirally from the communication hole 56 toward the outer periphery. The plurality of guide grooves 54 have a function of guiding the molding material flowing through the groove portions 41 to the communication hole 56 by the rotation of the flat screw 40. The guide grooves 54 increase the amount of supply of the material from the plasticizing device 30 to the downstream side.

As illustrated in FIG. 1, the discharge unit 60 has a nozzle 61 and a flow path 65. The nozzle 61 is coupled to the communication hole 56 of the screw-facing portion 50 via the flow path 65. The flow path 65 is a flow path for the molding material between the flat screw 40 and the nozzle 61.

Melting of the material in the plasticizing device 30 is realized by heating with the heating unit 58 of the screw-facing portion 50 and rotation of the flat screw 40. The melted material is pushed out to the flow path 65 of the discharge unit 60 via the communication hole 56 of the screw-facing portion 50 and is guided to the nozzle 61. The material guided to the nozzle 61 is finally discharged from an opening portion 62 toward the molding table 81.

In the molding device 100, instead of a configuration in which the molding table 81 is moved by the movement mechanism 80, a configuration in which the movement mechanism 80 moves the nozzle 61 with respect to the molding table 81 in a state where the position of the molding table 81 is fixed may be adopted. Even with such a configuration, the relative positional relationship between the nozzle 61 and the molding table 81 can be changed.

Figure 3:
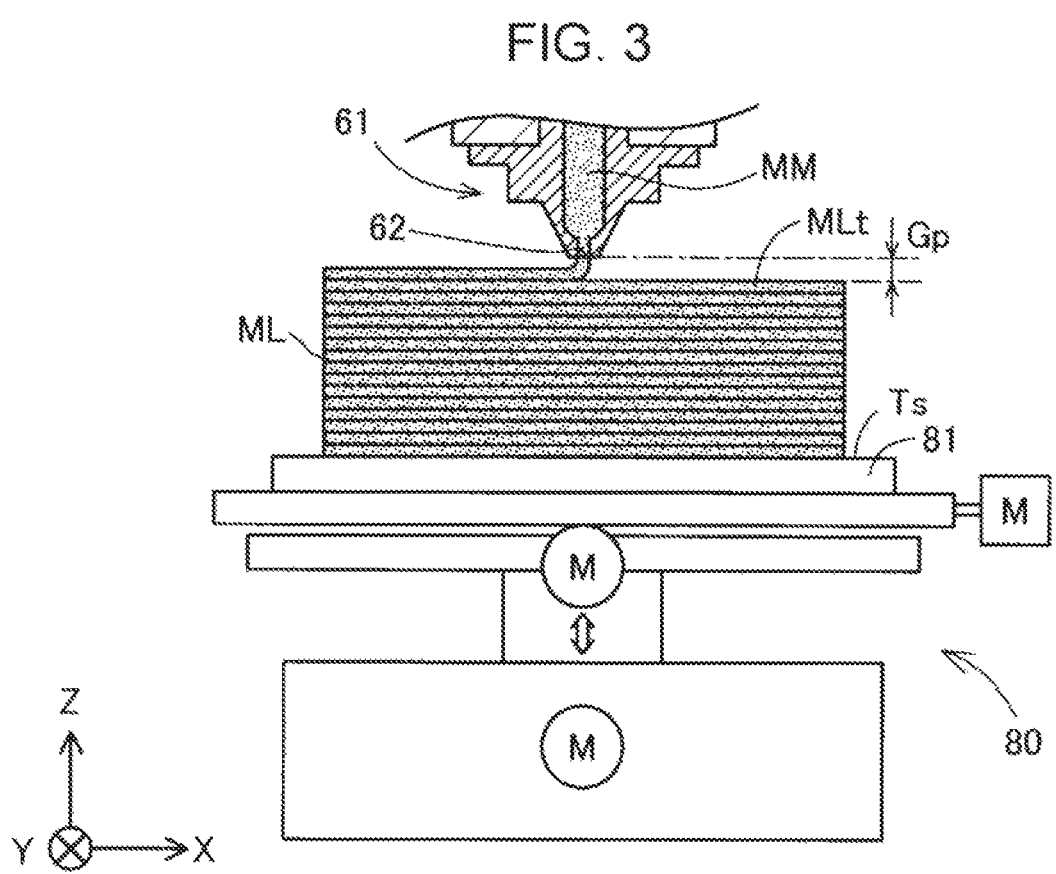
FIG. 3 is a schematic diagram schematically illustrating how a molding object is molded by discharge processing.

FIG. 3 is a schematic diagram schematically illustrating how a molding object is molded by discharge processing executed by the molding device 100. In FIG. 3, a state in which a molding material MM is discharged with the X direction as the scanning direction of the nozzle 61 is illustrated. In this specification, the "scanning direction of the nozzle 61" represents the direction in which the position of the nozzle 61 relatively moves with respect to the upper surface Ts of the molding table 81 while the nozzle 61 discharges the molding material.

In the discharge processing executed by the molding device 100, in the plasticizing device 30, at least a portion of the solid state material supplied to the flat screw 40, which is rotating, is melted to generate the molding material MM. While relatively changing the position of the nozzle 61 with respect to the molding table 81 in the scanning direction along the upper surface Ts of the molding table 81 by the movement mechanism 80, the molding material MM is discharged from the nozzle 61 toward a planned portion MLt. The control unit 90 controls the movement mechanism 80 to relatively move the position of the nozzle 61 in the Z direction with respect to the molding table 81 and the molding object is molded by further stacking the molding material MM on a molding layer ML formed by the discharge processing thus far.

A2. Delivery of Molding Material by Flat Screw

FIG. 4 is a perspective view illustrating a schematic configuration of the lower surface Fb side of the flat screw 40. The flat screw 40 illustrated in FIG. 4 is illustrated in a state in which the positional relationship between the upper surface Fa and the lower surface Fb illustrated in FIG. 1 is reversed in the vertical direction in order to facilitate understanding of the technique. FIG. 4 illustrates a rotation direction θ of the flat screw 40 in the plasticizing device 30 and the position of the rotation axis RX when rotating. The groove portions 41 are provided on the lower surface Fb of the flat screw 40 facing the screw-facing portion 50. Hereinafter, the lower surface Fb is also referred to as "groove-forming surface Fb".

The groove portions 41 are so-called scroll grooves extending spirally from the center of the groove-forming surface Fb toward the outer periphery of the flat screw 40. The groove portions 41 are formed of a bottom surface 42 on the Z direction side and ridge portions 43 as side walls. The groove portions 41 may be configured to extend in an involute curve shape or a spiral shape. The flat screw 40 of the present embodiment has a plurality of recessed portions H1 on the bottom surface 42 of the groove portions 41. Details of the recessed portions H1 will be described later.

The center portion 46 is, among the groove portions 41, a portion that is formed at the center of the groove-forming surface Fb of the flat screw 40. The center portion faces the communication hole 56 of the screw-facing portion 50. In the present embodiment, the center portion 46 intersects the rotation axis RX. The groove portions 41 are continuous from the center portion 46 to material charging ports 44 formed on the side surface of the flat screw 40.

The material charging ports 44 are openings formed in the side surface of the flat screw 40. The material charging ports 44 are, among end portions of the groove portions 41, coupled to end portions on the opposite side to end portions coupled to the center portion 46. The material charging ports 44 are portions that receive the material supplied via the communication path 22 of the material supply unit 20.

The flat screw 40 of the present embodiment has two groove portions 41 and two material charging ports 44. The numbers of the groove portions 41 and the material charging ports 44 provided in the flat screw 40 are not limited to two. In the flat screw 40, only one groove portion 41 may be provided, or a plurality of groove portions 41 of three or more may be provided. In addition, a number of the material charging ports 44 may be provided in accordance with the number of the groove portions 41.

When the flat screw 40 rotates in the rotation direction θ, at least a portion of the material supplied from the material charging port 44 and transported along the groove portions 41 is melted while being heated in the groove portions 41 by the heating unit 58 of the screw-facing portion 50 and the fluidity increases. Then, the material flows along the groove portions 41 to the center portion 46, gathers at the center portion 46, and is pushed out to the communication hole 56 of the screw-facing portion by the internal pressure generated within the center portion 46.

Figures 5, 6:
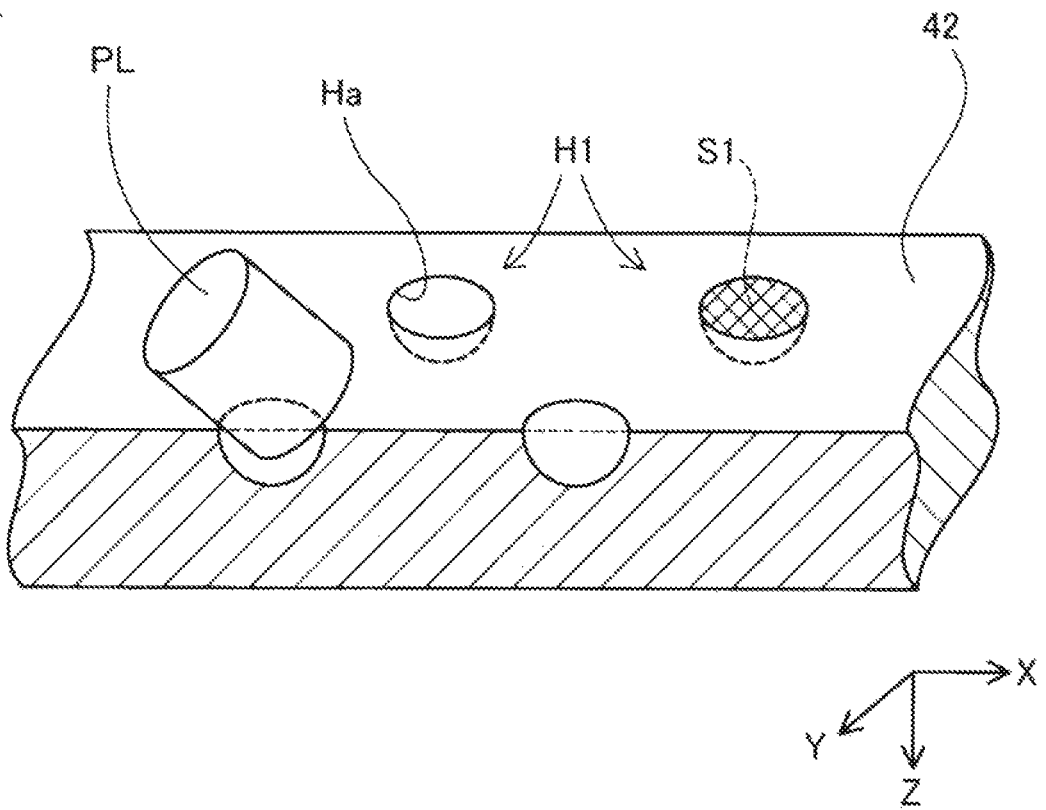
FIG. 5 is a schematic sectional perspective view of a configuration of a portion of a groove portion of a flat screw.
FIG. 6 is an explanatory view illustrating experimental data obtained by measuring an amount of discharge of a molding material by a molding device.

FIG. 5 is a schematic sectional perspective view of a configuration of a portion of the groove portions 41 of the flat screw 40. As described above, the flat screw 40 of the present embodiment has a plurality of recessed portions H1 on the bottom surface 42 of the groove portions 41. The recessed portions H1 are openings Ha at positions that are flush with the bottom surface 42 and are spaces coupled to the openings Ha. In FIG. 5, an area S1 of the openings Ha is schematically illustrated by cross hatching one opening Ha of the recessed portions H1. In the present embodiment, the recessed portions H1 are hemispherical with a radius of mm, and the shape of the openings Ha of the recessed portions H1 is a perfect circle with a radius of 1 mm. Therefore, the area S1 of the openings Ha is $\pi$ mm$^2$.

FIG. 5 schematically illustrates a material PL, which is the above-described pelletized TPU material. The size of the opening of the recessed portions H1 is substantially equal to or slightly smaller than the size of the material PL. In the present specification, "substantially equal to or slightly smaller than the size of the material PL" means that when the material PL has a predetermined shape, the material PL has such a size that, as a result of fitting into the recessed portions H1, the material PL hardly accumulates in the groove portions 41. It is desirable that the maximum value of the diameter of each of the openings Ha of the recessed portions H1 be about the same as or smaller than the maximum value among the three-dimensional-direction lengths, namely, the height, width and length, of the solid material PL. As a result, as illustrated in FIG. 5, the solid TPU material in the course of plasticization is easily caught in the recessed portions H1, and the rotational force of the flat screw 40 is easily transmitted to the TPU material. That is, the material flowing through the groove portions 41 hardly accumulates in the channel.

The number of the recessed portions H1 is defined by the ratio between the sum of the opening areas of the recessed portions H1 and the area of the bottom surface 42. The "area of the bottom surface 42" is the area of the surface of the bottom surface 42 excluding the recessed portions H1. In the present embodiment, the recessed portions H1 are formed in such a manner that the total sum of the opening areas obtained by multiplying the area S1 of each of the openings Ha by the number of the recessed portions H1 is smaller than the area of the bottom surface and are formed so as to be positioned at approximately equal intervals.

FIG. 6 is an explanatory view illustrating experimental data obtained by measuring the amount of discharge of the molding material discharged by the molding device 100 of the present embodiment. In the present specification, "amount of discharge of the molding material" refers to the weight of the molding material (in units of grams) discharged by the molding device 100 within a predetermined period. As a material, a TPU material in the form of pellets of "Resamin (registered trademark) P-2560" manufactured by Dainichiseika Color and Chemicals Mfg. Co., Ltd. was used. The flat screw 40 having the recessed portions H1 and a flat screw having the same shape as that of the flat screw 40 but without the recessed portions H1 were prepared and two molding devices 100 having the respective flat screws were used. The processing conditions of the molding devices 100 including the temperature inside the flat screw and the rotation speed of the flat screw were the same irrespective of the presence or absence of the recessed portions H1. Each of the molding devices 100 repeatedly discharged the molding material twenty times to measure the amount of discharge per unit time, and the average value (Ave), maximum value (Max) and minimum value (Min) of discharge, the difference (Max-Min) between the maximum value and the minimum value, and the standard deviation (σ) were obtained.

In the molding device 100 including the flat screw 40 having the recessed portions H1, the respective values of the average value, the maximum value and the minimum value of the amount of discharge are larger than those of the molding device 100 having the flat screw without the recessed portions H1 and the standard deviation is smaller. That is, by providing the recessed portions H1 in the flat screw 40, the amount of discharge of the molding device 100 increases and stabilizes.

As described above, according to the plasticizing device 30 of the present embodiment, by providing a plurality of recessed portions H1, which have a hemispherical shape, on the bottom surface 42 of the flat screw 40 that allows the granular material to flow, it is possible to realize an increase in and an improvement in the stability of the amount of supply of the material from the plasticizing device 30 to the downstream side, and it is possible to stabilize the amount of discharge of the molding device 100.

B. Second Embodiment

Figures 7, 8:
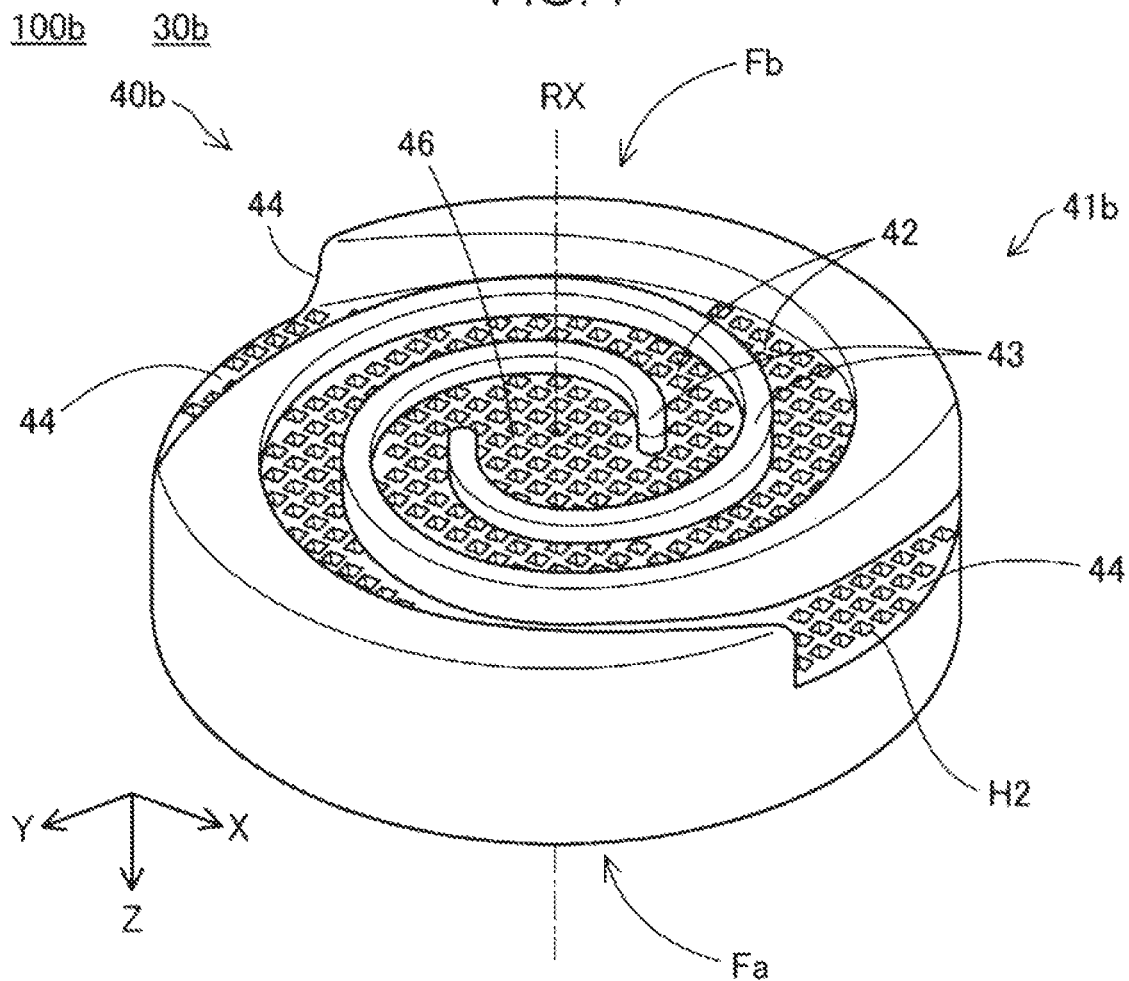
FIG. 7 is a perspective view illustrating a schematic configuration of a lower surface side of a flat screw according to a second embodiment.
FIG. 8 is an explanatory view illustrating experimental data obtained by measuring an amount of discharge of a molding material by a molding device.

FIG. 7 is a perspective view illustrating a schematic configuration of the lower surface Fb side of a flat screw 40b in a molding device 100b according to a second embodiment. The molding device 100b of the second embodiment is different from the molding device 100 of the first embodiment in that a plasticizing device 30b is provided instead of the plasticizing device 30 of the first embodiment, and other structures are the same as those of the molding device 100 of the first embodiment. The plasticizing device 30b of the second embodiment includes the flat screw 40b instead of the flat screw 40 of the first embodiment.

The flat screw 40b includes groove portions 41b instead of the groove portions 41 of the first embodiment. The groove portions 41b have a plurality of recessed portions H2 on the bottom surface 42 thereof. In the present embodiment, the recessed portions H2 are square pyramidal spaces with a depth of 1 mm, and the shape of the opening of the recessed portions H2, which is flush with the bottom surface 42, is a square with the length of each side being 1 mm. Therefore, the area of the opening of the recessed portions H2 is 1 mm². The opening of the recessed portions H2 is substantially equal to or slightly smaller than the size of the material PL, which is the pelletized TPU material described above. This makes it easier for the TPU material in a solid state in the course of plasticization to be caught in the recessed portions H2 and to easily transmit the rotational force of the flat screw 40b to the TPU material. That is, it is difficult for the material flowing through the groove portions 41b to accumulate in the channel. Like the recessed portions H1 of the first embodiment, the recessed portions H2 of the second embodiment are provided at equal intervals so that the sum of the opening areas is smaller than the area of the bottom surface 42.

FIG. 8 is an explanatory diagram illustrating experimental data obtained by measuring the amount of discharge of the molding material by the molding device 100b of the second embodiment. The flat screw 40b having the recessed portions H2 and a flat screw having the same shape as the flat screw 40b but without the recessed portions H2 were prepared and two molding devices 100b having the respective flat screws were used. The measuring conditions and the like are the same as the measuring method for measuring the amount of discharge by the molding device 100 of the first embodiment.

In the molding device 100b including the flat screw 40b having the recessed portions H2, the values of the average value, the maximum value, and the minimum value of the amount of discharge are larger than those of the molding device 100b including the flat screw 40b without the recessed portions H2, and the standard deviation is substantially equal to that of the molding device 100b including the flat screw 40b without the recessed portions H2. That is, by providing the recessed portions H2 in the flat screw 40b, the amount of discharge of the molding device 100b increases and stabilizes.

As described above, according to the plasticizing device 30b of the present embodiment, by providing a plurality of recessed portions H2, which have a square pyramidal shape, on the bottom surface 42 of the groove portions 41b of the flat screw 40b through which the granular material flows, it is possible to realize an increase in and an improvement in the stability of the amount of supply of the material from the plasticizing device 30b downstream and it is possible to stabilize the amount of discharge of the molding device 100b.

C. Third Embodiment

Figures 9, 10:
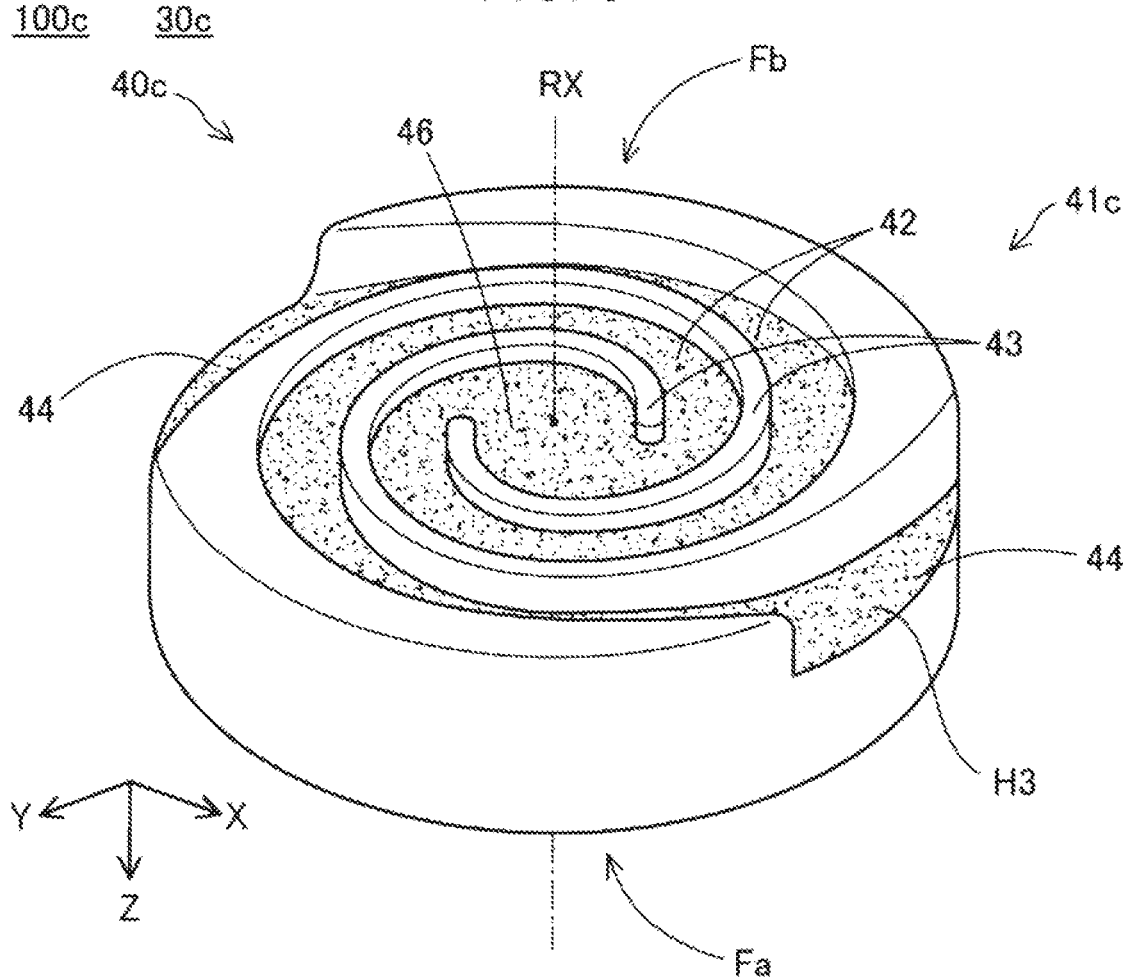
FIG. 9 is a perspective view illustrating a schematic configuration of a lower surface side of a flat screw according to a third embodiment.
FIG. 10 is an explanatory view illustrating experimental data obtained by measuring an amount of discharge of a molding material by a molding device.

FIG. 9 is a perspective view illustrating a schematic configuration of the lower surface Fb side of a flat screw 40c in a molding device 100c according to a third embodiment. The molding device 100c of the third embodiment is different from the molding device 100 of the first embodiment in that a plasticizing device 30c is provided instead of the plasticizing device 30 of the first embodiment. The plasticizing device 30c of the third embodiment includes the flat screw 40c instead of the flat screw 40 of the first embodiment.

The flat screw 40c includes groove portions 41c instead of the groove portions 41 of the first embodiment. The groove portions 41c have a plurality of recessed portions H3 on the bottom surface 42 thereof. In the present embodiment, the recessed portions H3 are recessed portions obtained by making the bottom surface 42 a rough surface with a surface roughness Ra of 20 μm and a height roughness Rz of 60 μm. The recessed portions H3 are formed by subjecting the bottom surface 42 of the flat screw 40c to commonly used electric discharge machining using arc discharge. As a result, the solid portion of the TPU material being plasticized is likely to be caught in the plurality of recessed portions. That is, the material flowing through the groove portions 41 hardly accumulates in the channel. Therefore, the rotational force of the flat screw 40c, which is rotating, is more easily transmitted to the material. In the present specification, the surface roughness Ra refers to an arithmetic average roughness in conformity with the JIS standard (JIS B 0601: 2013), and the height roughness Rz is the maximum height roughness in conformity with the JIS standard. Further, the roughness of the rough surface of the bottom surface 42 is not limited to the surface roughness Ra and the height roughness Rz and it can be defined by any of various parameters according to the JIS standard (JIS B 0601: 2013) such as a root mean square roughness Rq, a roughness curve maximum valley depth Rv, and a roughness curve maximum peak height Rp. In addition, the recessed portions H3 are not limited to a surface roughness Ra of 20 μm and a height roughness Rz of 60 μm but may be a rough surface having a surface roughness Ra of 20 μm or more or may be a rough surface having a height roughness Rz of 60 μm or more.

FIG. 10 is an explanatory view illustrating experimental data obtained by measuring the amount of discharge of the molding material by the molding device 100c of the third embodiment. The flat screw 40c provided with the recessed portions H3 and the flat screw 40c not provided with the recessed portions H3 were prepared and two of the molding devices 100c having respective ones of the flat screws 40c were used. The measuring conditions and the like are the same as in the measuring method for measuring the amount of discharge by the molding device 100 of the first embodiment.

In the molding device 100c including the flat screw 40c having the recessed portions H3, the respective values of the average value, the maximum value and the minimum value of the amount of discharge are larger than those of the molding device 100c having the flat screw 40c without the recessed portions H3 and the standard deviation is smaller. That is, by providing the recessed portions H3 in the flat screw 40c, the amount of discharge of the molding device 100c increases and stabilizes.

As described above, according to the plasticizing device 30c of the present embodiment, the bottom surface 42 of the groove portions 41c of the flat screw 40c through which the granular material flows includes a plurality of recessed portions H3 obtained by making the bottom surface 42 a rough surface of predetermined roughness. As a result, it is possible to realize an increase in and an improvement in the stability of supply of the amount of the material from the plasticizing device 30c to the downstream side, and it is possible to stabilize the discharge of the molding device 100c. In addition, commonly used electric discharge machining can be applied to the processing of the flat screw 40c. Therefore, the recessed portions H3 of the groove portions 41c can be obtained by a simpler method. By electric discharge machining, the flat screw 40c can be precisely machined, and even if the flat screw 40c is formed of a hard material, the groove portions 41c having the recessed portions H3 can be obtained.

D. Fourth Embodiment

Figure 11:
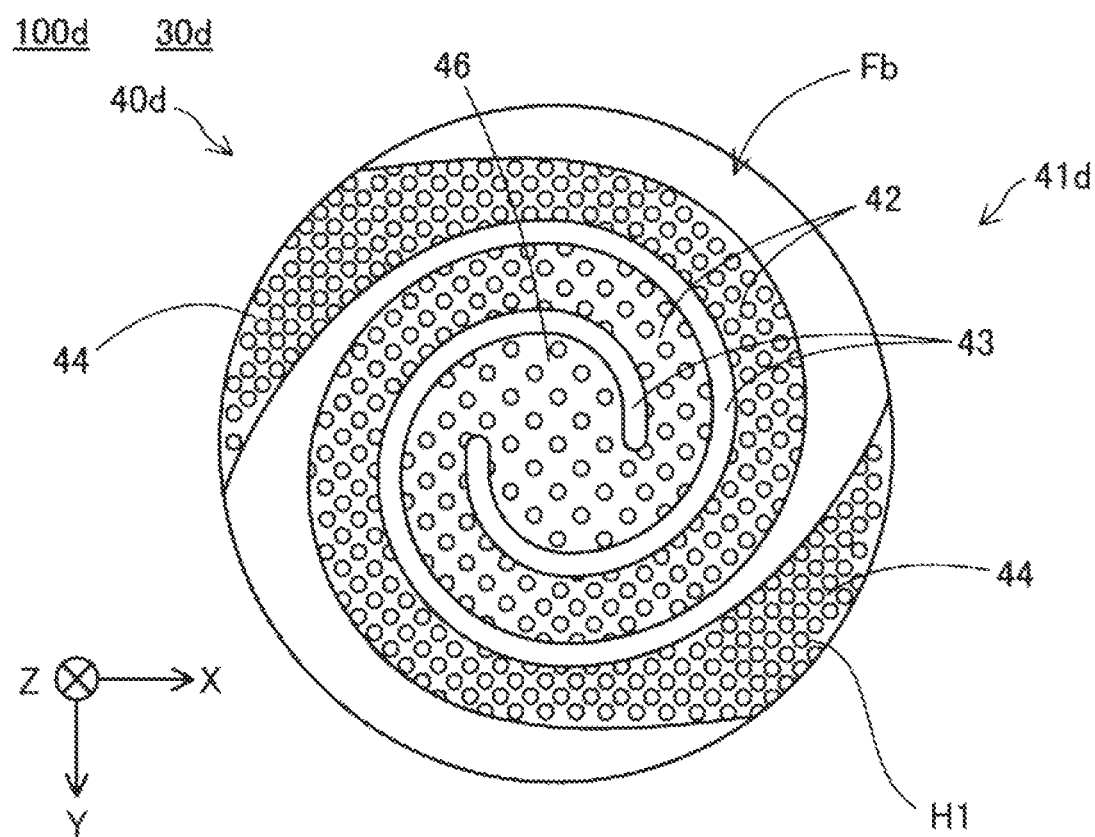
FIG. 11 is a front view illustrating a schematic configuration of a lower surface side of a flat screw according to a fourth embodiment.

FIG. 11 is a front view illustrating a schematic configuration of the lower surface Fb side of a flat screw 40d of a molding device 100d of a fourth embodiment. In FIG. 11, a lower surface view of the flat screw 40d in a direction along the Z direction is illustrated. The molding device 100d of the fourth embodiment is different from the molding device 100 of the first embodiment in that a plasticizing device 30d is provided instead of the plasticizing device 30 of the first embodiment, and other structures are the same as those of the molding device 100 of the first embodiment. The plasticizing device 30d of the fourth embodiment includes the flat screw 40d instead of the flat screw 40 of the first embodiment.

The flat screw 40d includes groove portions 41d instead of the groove portions 41 of the first embodiment. The groove portions 41d have a plurality of the recessed portions H1 on the bottom surface 42 thereof. The recessed portions H1 are hemispherical spaces having a radius of 1 mm and are the same as the recessed portions H1 of the first embodiment. As described above, the number of the recessed portions H1 is defined by the ratio between the sum of the opening areas of the recessed portions H1 and the area of the bottom surface 42 similarly to the recessed portions H1 of the first embodiment. In the present embodiment, the total sum of the opening areas of the recessed portions H1 in the vicinity of the center portion 46 is approximately a quarter of the area of the bottom surface 42, and the sum of the opening areas of the recessed portions H1 in the vicinity of the material charging ports 44 is approximately one half of the area of the bottom surface 42. In the present embodiment, the proportion of the opening areas of the recessed portions H1 is gradually increased on the bottom surface 42 of the groove portions 41d from the center portion 46 toward the material charging ports 44 in a stepwise manner. As described above, the recessed portions H1 of the groove portions 41d of the flat screw 40d of the present embodiment are disposed in the bottom surface 42 such that the number thereof increases closer to the material charging ports 44, which are end portions on the opposite side to the center portion 46, which is the center of the groove portions 41d.

The material to be put into the flat screw 40d is closer to a solid because it is less plasticized as it is closer to the material charging ports 44. On the other hand, plasticization progresses as the material approaches the center portion 46, which is the center of the groove portions 41 separated from the material charging ports 44. In the flat screw 40d of this embodiment, the recessed portions H1 are provided in the vicinity of the material charging ports 44 having a high proportion of the solid material. Therefore, the solid material in the middle of plasticization is likely to be caught in the plurality of recessed portions, and the rotational force of the flat screw 40d is easily transmitted to the material being plasticized.

E. Molding Material

In each of the above embodiments, a TPU material in pellet form was used; however, as a material used in the plasticizing device 30, for example, it is also possible to adopt a material which can be molded into a molding object using any of various materials such as a thermoplastic material, a metal material, a ceramic material and the like as the main material. Here, "the main material" refers to a material which forms the center of the shape of the molding object, and refers to a material occupying 50% by weight or more of the molding object. The above-mentioned molding materials include those obtained by melting the main material alone, and those in which some components contained together with the main material are melted to form a paste.

When a thermoplastic material is used as the main material, in the plasticizing device 30, the molding material MM is produced by plasticizing the thermoplastic material. "Plasticizing" means that thermoplastic material is heated and melted.

As a thermoplastic material, for example, any one or a combination of two or more of the following thermoplastic resin materials can be used.

Examples of Thermoplastic Resin Material

Examples of a thermoplastic resin material include general purpose engineering plastics such as polypropylene resin (PP), polyethylene resin (PE), polyacetal resin (POM), polyvinyl chloride resin (PVC), polyamide resin (PA), acrylonitrile.butadiene.styrene resin (ABS), polylactic acid resin (PLA), polyphenylene sulfide resin (PPS), polyether ether ketone (PEEK), polycarbonate (PC), modified polyphenylene ether, polybutylene terephthalate, and polyethylene terephthalate, and engineering plastics such as polysulfone, polyethersulfone, polyphenylene sulfide, polyarylate, polyimide, polyamide imide, polyether imide, and polyether ether ketone.

Additives such as pigments, metals, ceramics, and, in addition, wax, flame retardant, antioxidant, thermal stabilizer and the like may be mixed in the thermoplastic material. In the plasticizing device 30, the thermoplastic material is plasticized by the rotation of the flat screw 40 and the heating of the heating unit 58 and converted into a melted state. In addition, the molding material MM thus generated is discharged from the nozzle 61, and then cured by a decrease in temperature.

It is desirable that the thermoplastic material be injected from the nozzle 61 in a completely melted state in which it is heated to a temperature higher than its glass transition point. For example, it is desirable that the ABS resin have a glass transition point of about 120° C. and when it is injected from the nozzle 61, it be about 200° C. In order to inject the molding material MM under such a high temperature state, a heater may be provided around the nozzle 61.

In the molding device 100, for example, the following metallic materials may be used as the main material instead of the above-mentioned thermoplastic material. In this case, it is desirable that a component melted at the time of production of the molding material MM be mixed with a powder material obtained by powdering the following metallic material in powder form and be put into the plasticizing device 30.

Examples of Metal Material

Examples of a metal material include a single metal of magnesium (Mg), iron (Fe), cobalt (Co), chromium (Cr), aluminum (Al), titanium (Ti), copper (Cu), nickel (Ni) or an alloy containing one or more of these metals.

Examples of Alloy

Examples of an alloy include maraging steel, stainless steel, cobalt chromium molybdenum, titanium alloy, nickel alloy, aluminum alloy, cobalt alloy, and cobalt chromium alloy.

In the molding device 100, it is possible to use a ceramic material as a main material instead of the above-mentioned metal material. As the ceramic material, for example, oxide ceramics such as silicon dioxide, titanium dioxide, aluminum oxide, zirconium oxide and the like, and non-oxide ceramics such as aluminum nitride and the like can be used. In the case where the above-described metal material or ceramic material is used as the main material, the molding material MM disposed on the molding table 81 may be hardened by irradiation with laser or sintering with warm air or the like.

The powder material of the metal material or the ceramic material to be charged into the material supply unit 20 may be a mixed material obtained by mixing plural types of single metal powder, alloy powder, and ceramic material powder. In addition, the powder material of a metal material or a ceramic material may be coated with, for example, a thermoplastic resin as exemplified above or another thermoplastic resin. In this case, in the plasticizing device 30, the thermoplastic resin may be melted so as to have fluidity.

For example, the following solvents can be added to the powder material of the metallic material or the ceramic material to be charged into the material supply unit 20. As the solvent, one type or two or more types selected from the following can be used in combination.

Examples of Solvent

Examples of a solvent include water; (poly) alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate, aromatic hydrocarbons such as benzene, toluene, and xylene; ketones such as methyl ethyl ketone, acetone, methyl isobutyl ketone, ethyl n-butyl ketone, diisopropyl ketone, and acetylacetone; alcohols such as ethanol, propanol, and butanol; tetraalkylammonium acetate; sulfoxide type solvents such as dimethylsulfoxide, diethylsulfoxide and the like, pyridine solvents such as pyridine, γ-picoline, and 2,6-lutidine; tetraalkylammonium acetate (for example, tetrabutylammonium acetate); and ionic liquids such as butyl carbitol acetate.

In addition, for example, the following binder may be added to the powder material of the metal material or the ceramic material to be charged into the material supply unit 20.

Examples of Binder

Examples of a binder include acrylic resin, epoxy resin, silicone resin, cellulose resin or another synthetic resin, or PLA (polylactic acid), PA (polyamide), PPS (polyphenylene sulfide), PEEK (polyether ether ketone) or another thermoplastic resin.

F. Fifth Embodiment

Figure 12:
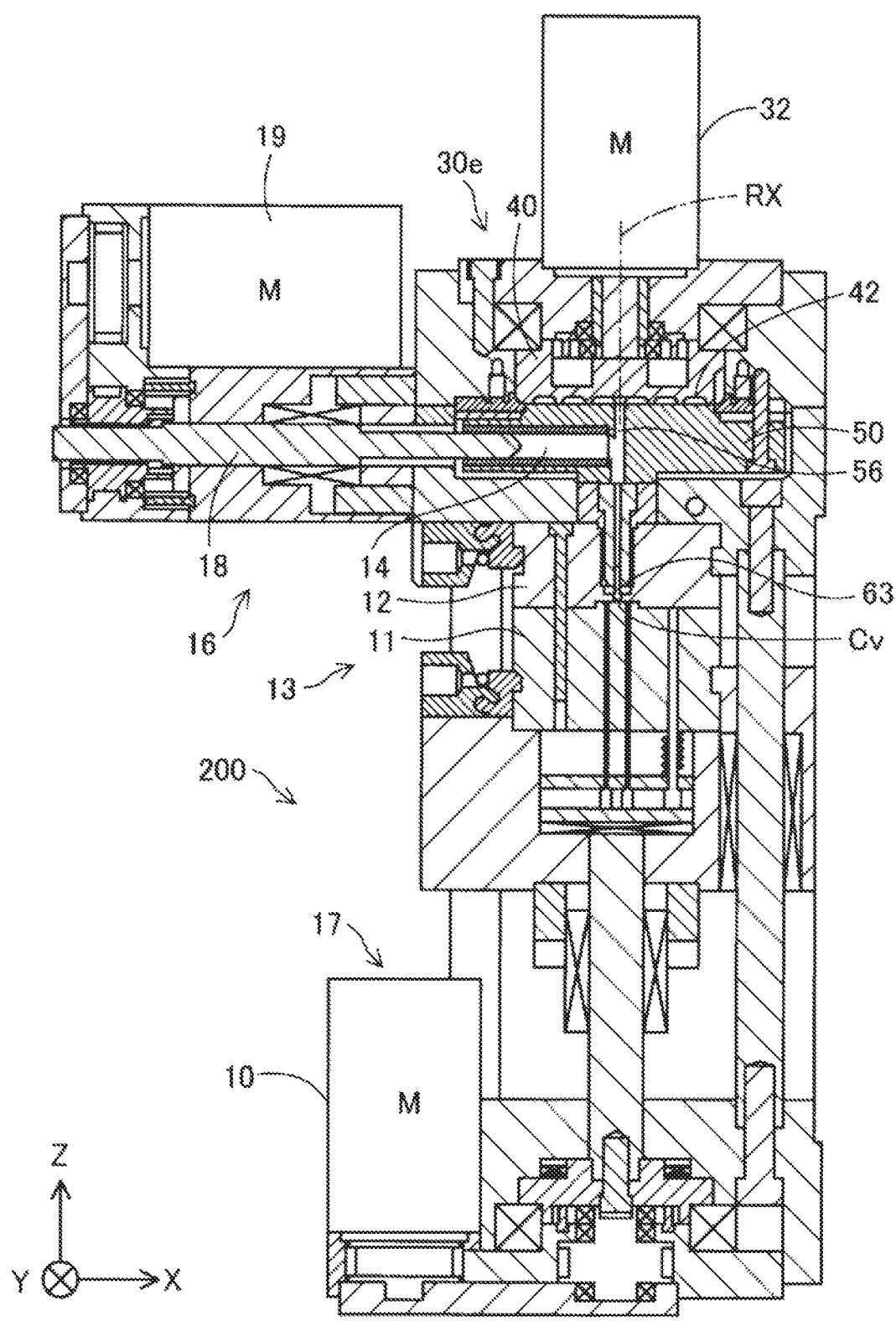
FIG. 12 is a schematic diagram illustrating a configuration of an injection molding machine, where some members are illustrated in cross section.

FIG. 12 is a schematic diagram illustrating a configuration of an injection molding machine 200 according to a fifth embodiment where some members are illustrated in cross section. The injection molding machine 200 includes a plasticizing device 30e, an injection control mechanism 16, a nozzle 63, a molding section 13, and a mold clamping device 17.

The plasticizing device 30e plasticizes at least a portion of the supplied granular material to generate a paste-like molding material having fluidity and guides it from the communication hole 56 to the injection control mechanism 16. The plasticizing device 30e has the drive motor 32, the flat screw 40 as a first member, and the screw-facing portion 50 as a second member. The specific configuration of the flat screw 40 and the screw-facing portion 50 is the same as that of the flat screw 40 and the screw-facing portion 50 of the first embodiment.

The injection control mechanism 16 includes an injection cylinder 14, a plunger 18, and a plunger driving unit 19. The injection control mechanism 16 has a function of injecting the plasticized material in the injection cylinder 14 into a cavity Cv described later. The injection control mechanism 16 controls the amount of injection of the material from the nozzle 63. The injection cylinder 14 is a substantially cylindrical member coupled to the communication hole 56 of the screw-facing portion 50 and has the plunger 18 inside. The plunger 18 slides inside the injection cylinder 14 and pressure-feeds the material in the injection cylinder 14 to the nozzle 63 coupled to the plasticizing device 30e. The plunger 18 is driven by the plunger driving unit 19 constituted by a motor.

The molding section 13 includes a movable mold 11 and a fixed mold 12. The movable mold 11 and the fixed mold 12 are provided facing each other, and a cavity Cv which is a space corresponding to the shape of the molded article is provided between them. The plasticized material is pressure-fed into the cavity Cv by the injection control mechanism 16 and is injected through the nozzle 63.

The mold clamping device 17 has a mold driving portion 10 and has a function of opening and closing the movable mold 11 and the fixed mold 12. The mold clamping device 17 drives the mold driving portion 10 to move the movable mold 11 to open and close the molding section 13.

As described above, the injection molding machine 200 of the present embodiment includes the plasticizing device 30e having the same configuration as the plasticizing device 30 of the first embodiment. Therefore, the rotational force of the flat screw 40, which is rotating, is easily transmitted to the material, and the amount of material flowing through the flat screw 40 can be increased. Therefore, it is possible to increase the amount of supply of the material from the plasticizing device 30e to the injection cylinder 14 of the injection control mechanism 16 on the downstream side.

G. Other Embodiments (G1) The plasticizing device 30e of the injection molding machine 200 of the fifth embodiment includes the flat screw 40 of the first embodiment. On the other hand, the plasticizing device of the injection molding machine is not limited to the flat screw 40 of the first embodiment, and the flat screw of each embodiment can be adopted.

(G2) As an example of the shape of the recessed portions of the plasticizing device 30 of each of the above embodiments, the recessed portions H1, which have a hemispherical shape, and the recessed portions H2, which have a square pyramidal shape, are illustrated, but the shape of the recessed portions is not limited thereto, it is possible to adopt any of various shapes such as a prismatic shape such as a square prism or a hexagonal prism, a shape obtained by combining a plurality of predetermined shapes, a shape obtained by combining these shapes with each other, and a shape obtained by partially overlapping these shapes. In addition, the recessed portions may be inclined at a predetermined angle with respect to the bottom surface of the groove portions. In such an embodiment, it is preferable that the recessed portions have a size that does not allow the material flowing through the groove portions to accumulate, and it is more preferable that the size of the recessed portion be smaller than the size of the material before plasticization.

(G3) As an example of the shape of the recessed portions of the plasticizing device 30 of each of the above embodiments, examples of the recessed portions H1, which have a hemispherical shape, and the recessed portions H2, which have a square pyramidal shape, are illustrated for each flat screw of each embodiment. On the other hand, the shape of the recessed portions is not required to be one type of shape with respect to the flat screw. In addition to the shape of recessed portions having a hemispherical shape or square pyramidal shape, recessed portions adopting two or more shapes such as by combining various shapes may be used in one flat screw.

(G4) The recessed portions H3 of the bottom surface 42 of the flat screw 40c of the third embodiment can be obtained by forming a rough surface formed by electric discharge machining. On the other hand, the recessed portions H3 are not limited to the electric discharge machining, and various surface treatment methods such as sand blasting, disk sander, and wire wheel methods can be applied. In such an aspect, a treatment such that the surface roughness Ra is 20 μm or more can be applied.

(G5) In the first embodiment and the second embodiment, the sizes of the openings of the recessed portions H1 and H2 are substantially equal to or slightly smaller than the size of the material PL. On the other hand, the sizes of the openings of the recessed portions H1 and H2 need not all be smaller than the material PL, and may include recessed portions larger than the size of the material PL. In such an embodiment, it is more preferable that the size of the recessed portions be smaller than the material so as to prevent the material from staying in the groove portions by fitting into the recessed portions. By providing recessed portions smaller than the material in the groove portions, the amount of discharge of the molding device increases.

(G6) In the first and second embodiments, an example in which the sum of the opening areas of the recessed portions H1 and H2 is provided so as to be smaller than the area of the bottom surface 42 is illustrated. On the other hand, the total sum of the opening areas of the recessed portions need not be smaller than the area of the bottom surface of the groove portions; for example, the sum of the opening areas of the recessed portions may be larger than the area of the bottom surface of the groove portions. In such an aspect, it is more preferable that the sum of the opening areas be smaller than the area of the bottom surface so that the solid material, in the middle of plasticizing, flowing through the groove portion is easily caught in the plurality of recessed portions.

(G7) In the plasticizing device of each of the above-described embodiments, for example, recessed portions H1 having a hemispherical shape and having a radius of 1 mm and recessed portions H2 having a square pyramidal shape and having a depth of 1 mm are exemplified for each flat screw of each embodiment including recessed portions of one type of size. On the other hand, it is not necessary for the recessed portions to be of one size for a single flat screw, and a single flat screw may be provided with groove portions adopting recessed portions of two or more sizes, for example, a combination of recessed portions of various sizes. In addition, the size of the recessed portions may be set so as to decrease gradually toward the center side of the groove portions. Plasticization of the material charged from the material input port proceeds toward the center portion by circulating in the groove portions. That is, the solid portion of the material becomes smaller toward the center. In this manner, by reducing the size of the recessed portions in accordance with the change in the shape of the material, the solid material in the process of plasticization is likely to be caught in the plurality of recessed portions. Therefore, the rotational force of the flat screw is more easily transmitted to the material being plasticized.

(G8) In the plasticizing device 30d of the fourth embodiment, the proportion of the opening areas of the recessed portions H1 is gradually increased from the center portion 46 toward the material charging port 44 on the bottom surface 42 of the groove portions 41d. On the other hand, when the distance along the bottom surface of the groove portions from the material charging ports to the center is equally divided into two, the number of recessed portions in the region on the material charging port side, which is on the opposite side to the center portion, may be larger than the number of recessed portions in the region on the center portion side of the bottom surface of the groove portions. According to this aspect of the plasticizing device, the solid material in the middle of plasticization is likely to be caught in the plurality of recessed portions and the rotational force of the flat screw is easily transmitted to the material being plasticized. Therefore, the rotational force of the flat screw is more easily transmitted to the material.

H. Other Aspects

The disclosure is not limited to the above-described embodiment, and can be realized in various configurations without departing from the gist thereof. For example, the present disclosure can also be realized by the following aspects. Technical features in the above embodiments corresponding to the technical features in each of the aspects described below may be used for solving some or all of the problems of the present disclosure or achieving some or all of the effects of the present disclosure, and may be replaced or combined as appropriate in order to achieve the object. In addition, unless technical features are described as essential in this specification, they can be deleted as appropriate.

(1) According to a first aspect of the present disclosure, a plasticizing device is provided. The plasticizing device includes a first member including a groove portion that has a spiral shape extending to a center, a motor that rotates the first member, a second member that faces the first member, and a heating unit that heats a material transported along the groove portion. The first member may include a plurality of recessed portions on a bottom surface of the groove portion. According to this plasticizing device, a plurality of recessed portions are provided on the bottom surface of the first member through which the material flows. Thereby, the rotational force of the rotating first member is easily transmitted to the material and the amount of material flowing through the first member can be increased. Therefore, the amount of supply of the material from the plasticizing device to the downstream side can be increased.

(2) In the plasticizing device of the first aspect, openings of the recessed portions on the bottom surface may be smaller than the material. According to this plasticizing device, recessed portions corresponding to the size of the material are provided on the surface of the groove portions. As a result, the solid material in the process of plasticization is likely to be caught in the plurality of recessed portions. Therefore, the rotational force of the rotating first member is more easily transmitted to the material.

(3) In the plasticizing device of the first aspect, a sum of the opening areas of the recessed portions may be smaller than an area of a surface of the bottom surface excluding the recessed portions. According to the plasticizing device of this aspect, the rotational force of the rotating first member is more easily transmitted to the material.

(4) In the plasticizing device of the first aspect, the recessed portions may be disposed so that the number of the recessed portions increases toward an end portion of the groove portion on an opposite side to the center. The material charged into the first member is closer to a solid because it is less plasticized as it is closer to the material charging port. On the other hand, plasticization proceeds toward the center away from the material charging port. According to the plasticizing device of this aspect, a lot of recessed portions are provided in the vicinity of the material charging port having a high proportion of the solid material. Therefore, the rotational force of the first member is more easily transmitted to the material being plasticized.

(5) In the plasticizing device of the first aspect, when a distance of the groove portion from the center to an end portion of the groove portion on an opposite side to the center is equally divided into two, the number of the recessed portions in a center side region of the groove portion may be larger than the number of the recessed portions in a region on an opposite side to the center side. According to the plasticizing device of this aspect, a lot of recessed portions are provided in the groove portion on the side of the material charging port having a high proportion of the solid material. Therefore, the rotational force of the first member is easily transmitted to the material being plasticized.

(6) In the plasticizing device of the first aspect, a size of the recessed portions may be smaller toward a center side of the groove portion. According to the plasticizing device of this aspect, recessed portions modified in such a manner are provided depending on the material to be transported in which the material in solid form is gradually melted toward the center of the first member. Therefore, the rotational force of the first member is more easily transmitted to the material depending on the form of the material.

(7) In the plasticizing device of the first aspect, the recessed portions may be hemispherical or square pyramidal spaces. According to the plasticizing device of this aspect, the rotational force of the rotating first member is more easily transmitted to the material.

(8) According to a second aspect of the present disclosure, a plasticizing device is provided. The plasticizing device includes a first member including a groove portion that has a spiral shape extending to a center, a motor that rotates the first member, a second member that faces the first member, and a heating unit that heats a material transported along the groove portion. The first member may have a rough surface having a surface roughness Ra of 20 μm or more on a bottom surface of the groove portion. According to the plasticizing device of this aspect, it is possible to obtain the recessed portions of the groove portions by a simpler method.

(9) In the plasticizing device of the second aspect, the rough surface may be formed by electric discharge machining. According to this type of plasticizing device, more precise processing can be performed and groove portions having recessed portions can be obtained even if the first member is a hard material.

(10) In the plasticizing device of the first aspect, the second member may include a communication hole and a guide groove extending spirally from the communication hole. According to the plasticizing device of this aspect, the material flowing through the groove portion by the rotation of the first member is more likely to be led along the guide groove to the communication hole. Therefore, the amount of supply of the material from the plasticizing device to the downstream side can be increased.

(11) According to a third aspect of the present disclosure, an injection molding machine is provided. The injection molding machine includes the plasticizing device of the first aspect; a nozzle that is coupled to the plasticizing device and that injects the material that has been plasticized; an injection control mechanism provided in a flow path of the material between the first member and the nozzle and controlling an amount of injection of the material from the nozzle; and a molding section having a space for containing the material injected from the nozzle.

(12) According to a fourth aspect of the present disclosure, there is provided a molding device for molding a three-dimensional molding object. The molding device includes the plasticizing device of the first aspect; a nozzle that is coupled to the plasticizing device and that discharges the material that is plasticized toward a table; a movement mechanism for moving at least one of the table and the nozzle; and a control unit that controls the motor of the plasticizing device and the movement mechanism to mold the three-dimensional molding object.

The present disclosure can be realized in various aspects other than the plasticizing device, the molding device, and the injection molding machine. For example, it can be realized in the form of a molding object and a molding molded by manufacturing methods of each of the above-mentioned devices and the devices, a control method for the molding device and injection molding machine, a control device for the molding device and injection molding machine, a method of depositing building material that forms a three-dimensional molding object, and the like. In addition, it can be realized in the form of a computer program for realizing the above-described method and control method, a non-transitory storage medium on which the computer program is recorded, and the like.

What is claimed is:

1. A plasticizing device comprising:
a first member including a groove portion that has a spiral shape extending to a center;
a motor that rotates the first member;
a second member that faces the first member; and
a heating unit that heats a material transported along the groove portion,
wherein the first member has a plurality of recessed portions on a bottom surface of the groove portion; and
wherein the recessed portions are disposed so that the number of the recessed portions increases toward an end portion of the groove portion on an opposite side to the center.

2. The plasticizing device according to claim 1,
wherein openings of the recessed portions on the bottom surface are smaller than the material.

3. The plasticizing device according to claim 2,
wherein a sum of opening areas of the recessed portions is smaller than an area of a surface of the bottom surface excluding the recessed portions.

4. The plasticizing device according to claim 1,
wherein, when a distance of the groove portion from the center to an end portion of the groove portion on an opposite side to the center is evenly divided into two, the number of the recessed portions in a center side region of the groove portion is larger than the number of the recessed portions in a region of the groove portion on an opposite side to the center side.

5. The plasticizing device according to claim 1,
wherein the recessed portions are hemispherical or square pyramidal spaces.

6. The plasticizing device according to claim 1,
wherein the second member includes
a communication hole, and
a guide groove extending spirally from the communication hole.

7. An injection molding machine comprising:
the plasticizing device according to claim 1;
a nozzle that is coupled to the plasticizing device and that injects the material that has been plasticized;
an injection control mechanism provided in a flow path of the material between the first member and the nozzle and controlling an amount of injection of the material from the nozzle; and
a molding section having a space for containing the material injected from the nozzle.

8. A molding device that molds a three-dimensional molding object, comprising:
the plasticizing device according to claim 1;
a nozzle that is coupled to the plasticizing device and that discharges the material that is plasticized toward a table;
a movement mechanism for moving at least one of the table and the nozzle; and
a control unit that controls the motor of the plasticizing device and the movement mechanism to mold the three-dimensional molding object.

9. A plasticising device comprising:
a first member including a groove portion that has a spiral shape extending to a center;
a motor that rotates the first member;
a second member that faces the first member; and
a heating unit that heats a material transported along the groove portion,
wherein the first member has a plurality of recessed portions on a bottom surface of the groove portion, and
wherein a size of the recessed portions is smaller toward a center side of the groove portion.

* * * * *